June 4, 1940.  R. H. JOHNSON  2,203,572
STRIPING OR BANDING MACHINE
Filed Aug. 25, 1936   8 Sheets-Sheet 1
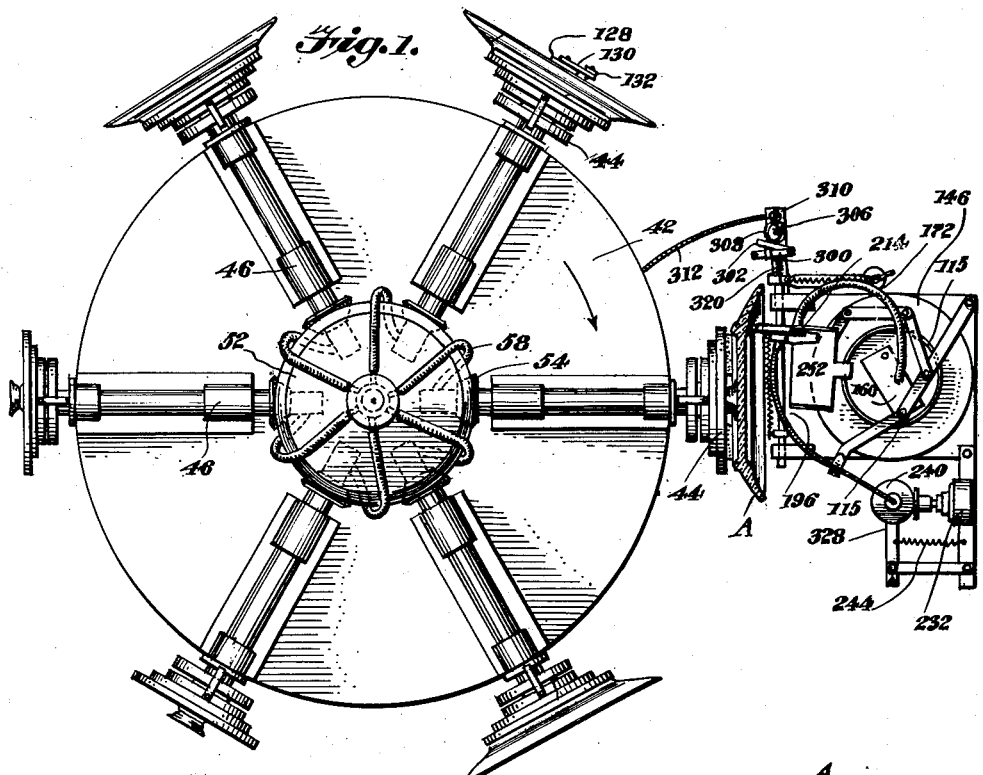
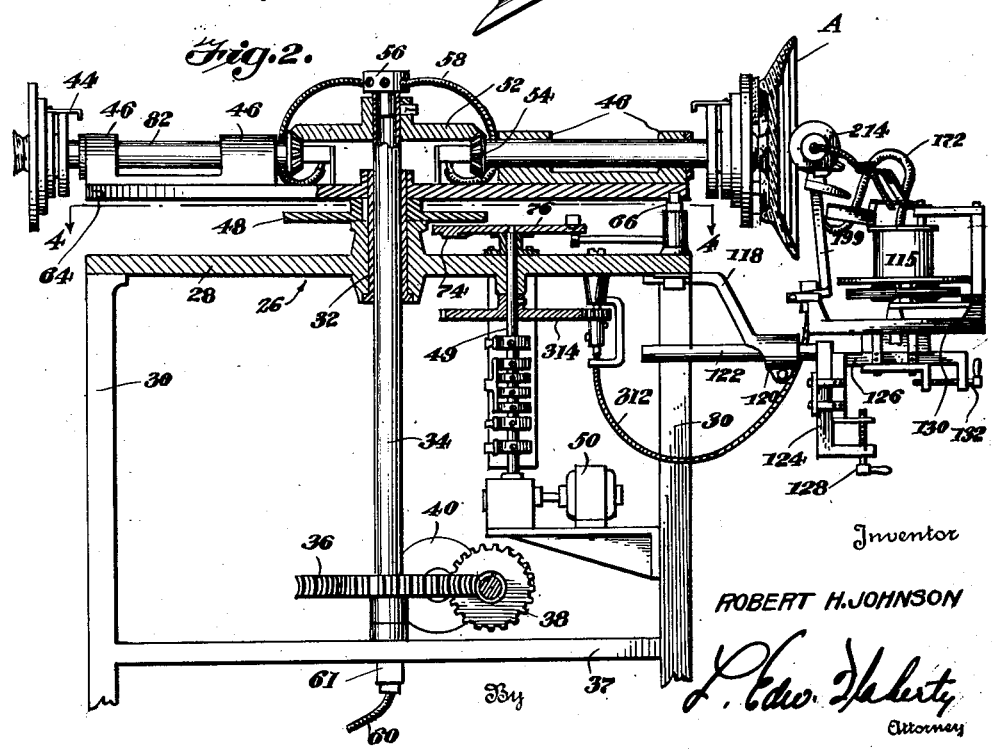
Inventor
ROBERT H. JOHNSON
By J. Edw. Haherty
Attorney June 4, 1940.    R. H. JOHNSON    2,203,572
STRIPING OR BANDING MACHINE
Filed Aug. 25, 1936    8 Sheets-Sheet 2

Inventor
ROBERT H. JOHNSON
By L. Edw. Flaherty
Attorney

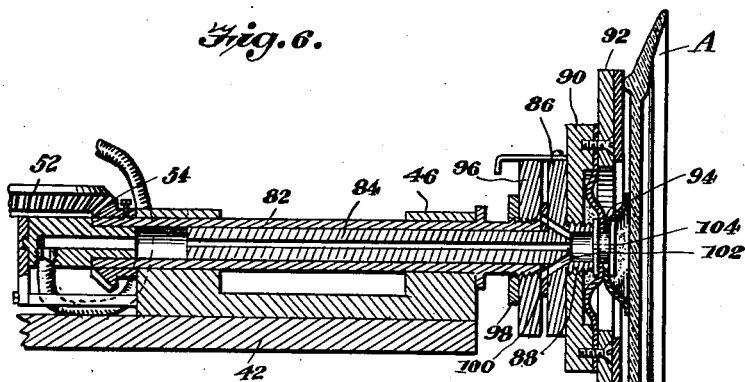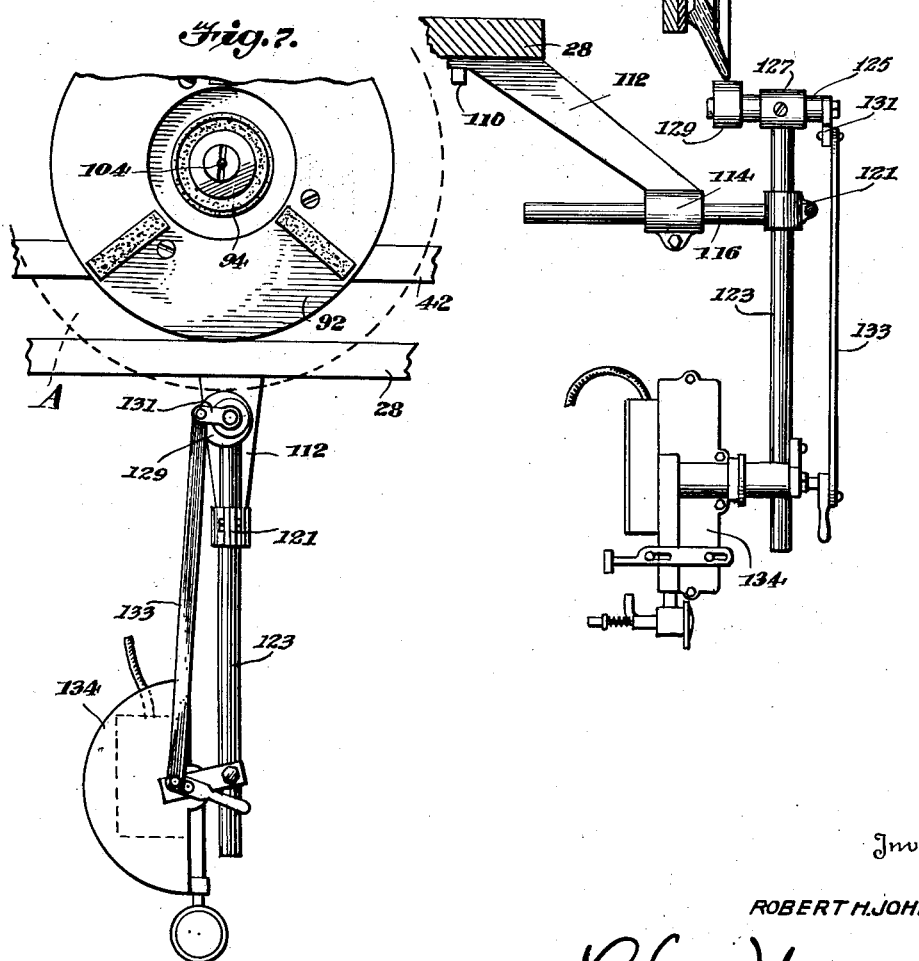

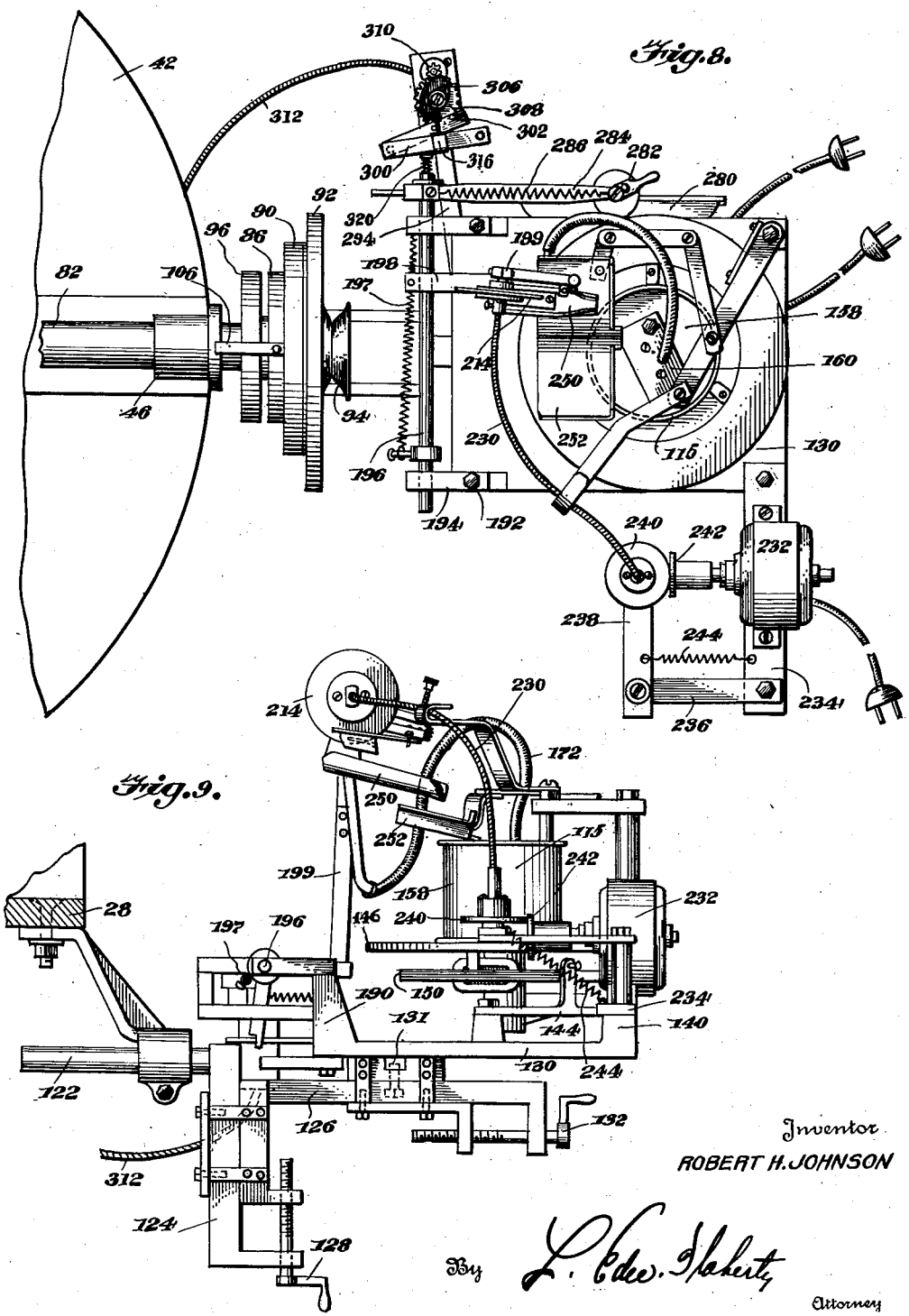

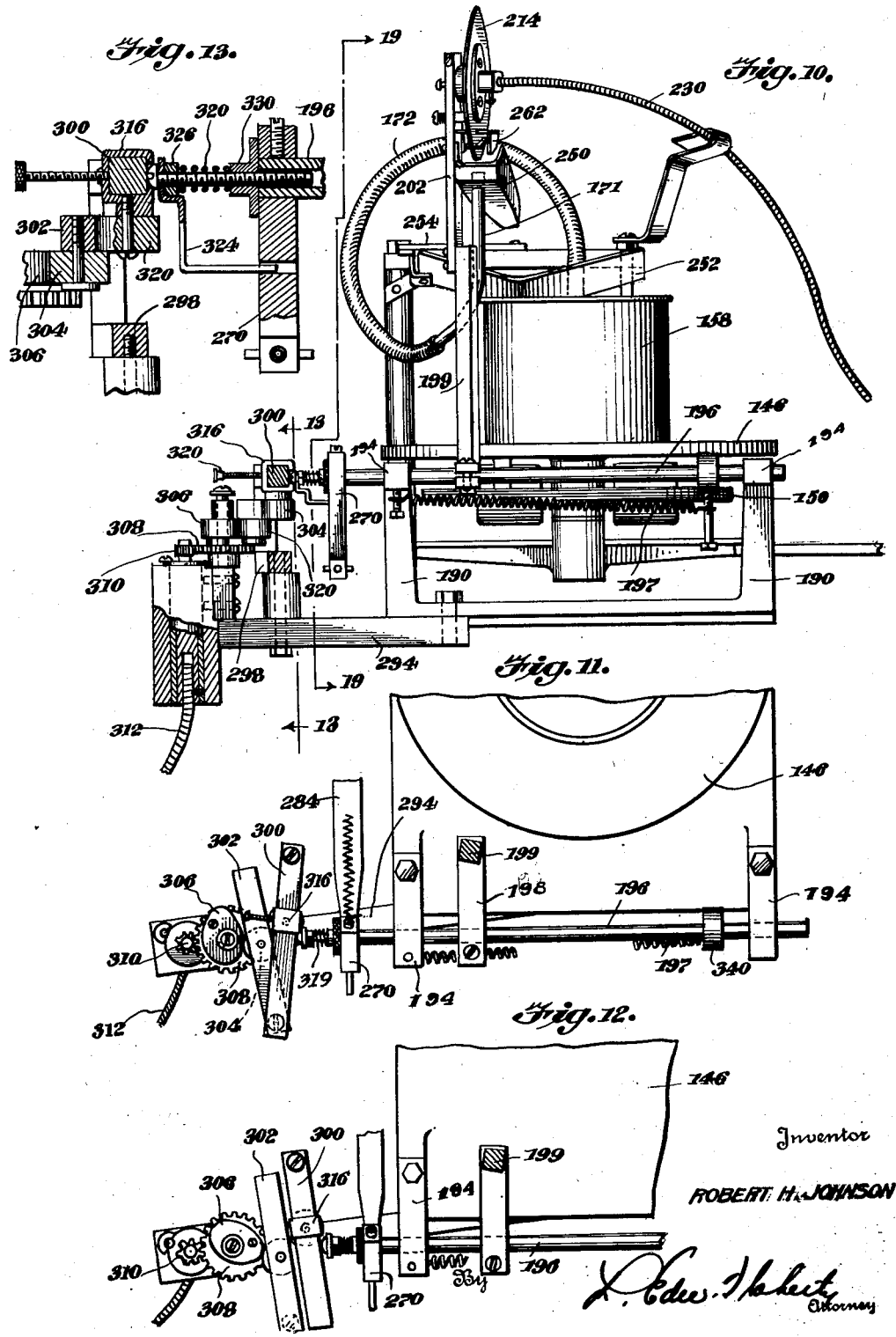

June 4, 1940.  R. H. JOHNSON  2,203,572
STRIPING OR BANDING MACHINE
Filed Aug. 25, 1936  8 Sheets-Sheet 6
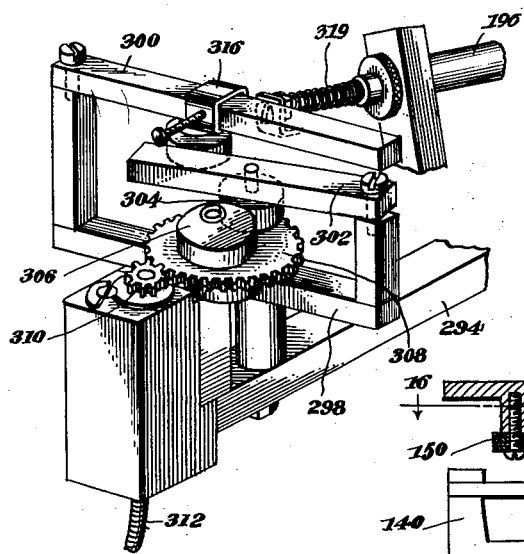
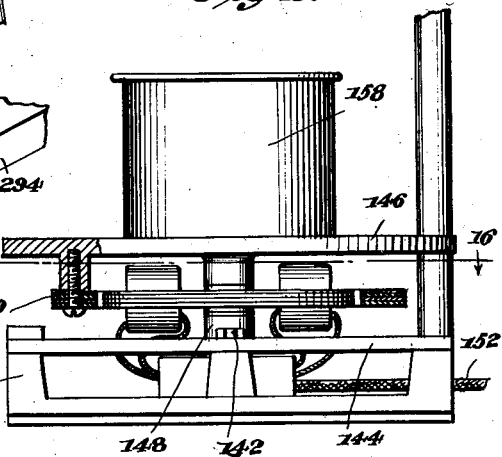
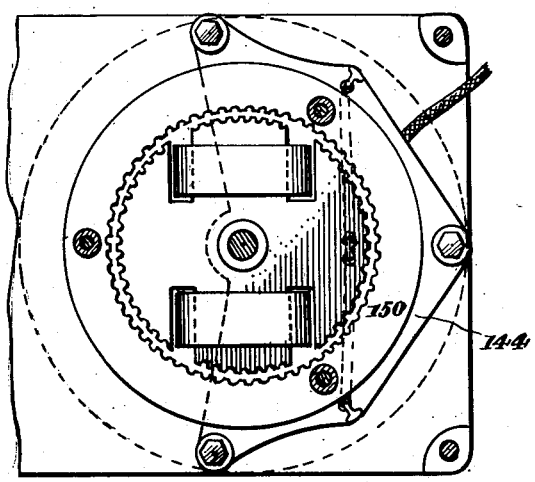
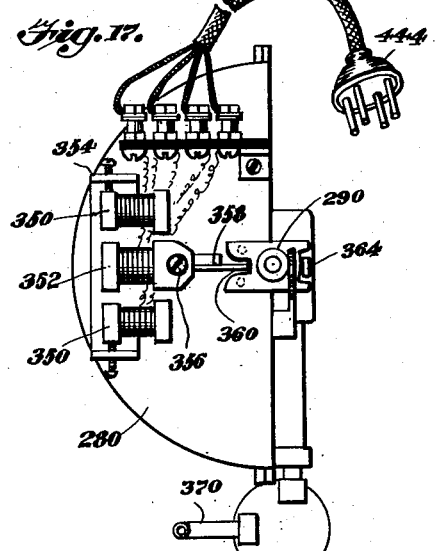
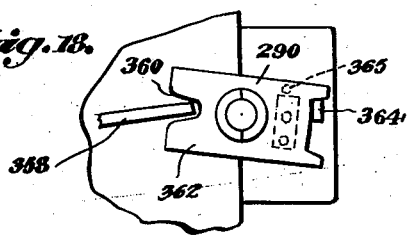
Inventor
ROBERT H. JOHNSON
By L. Edw. Doherty
Attorney June 4, 1940.  R. H. JOHNSON  2,203,572
STRIPING OR BANDING MACHINE
Filed Aug. 25, 1936  8 Sheets-Sheet 7
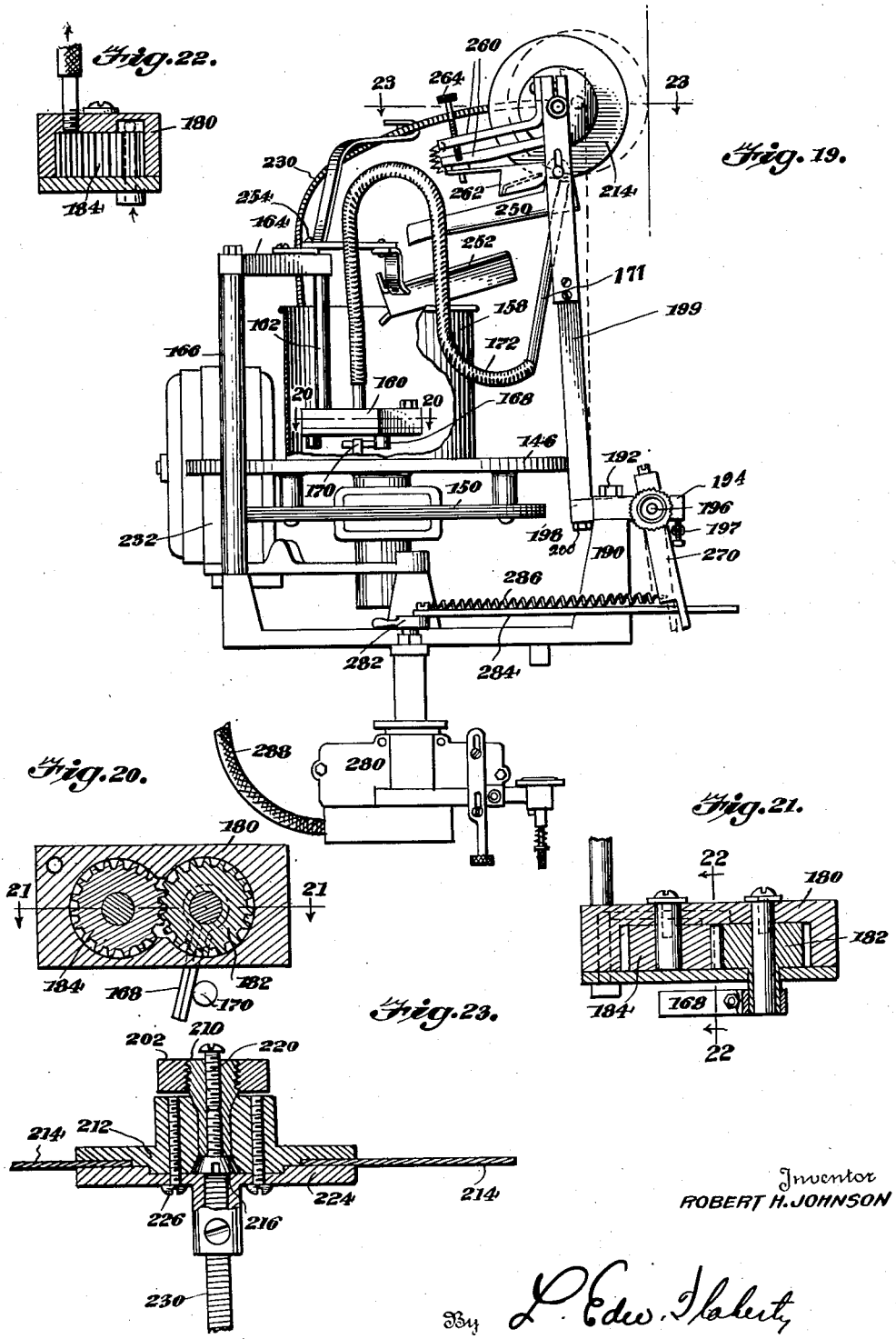
Inventor
ROBERT H. JOHNSON
By L. Edw. Flaherty,
Attorney June 4, 1940.   R. H. JOHNSON   2,203,572
STRIPING OR BANDING MACHINE
Filed Aug. 25, 1936   8 Sheets-Sheet 8
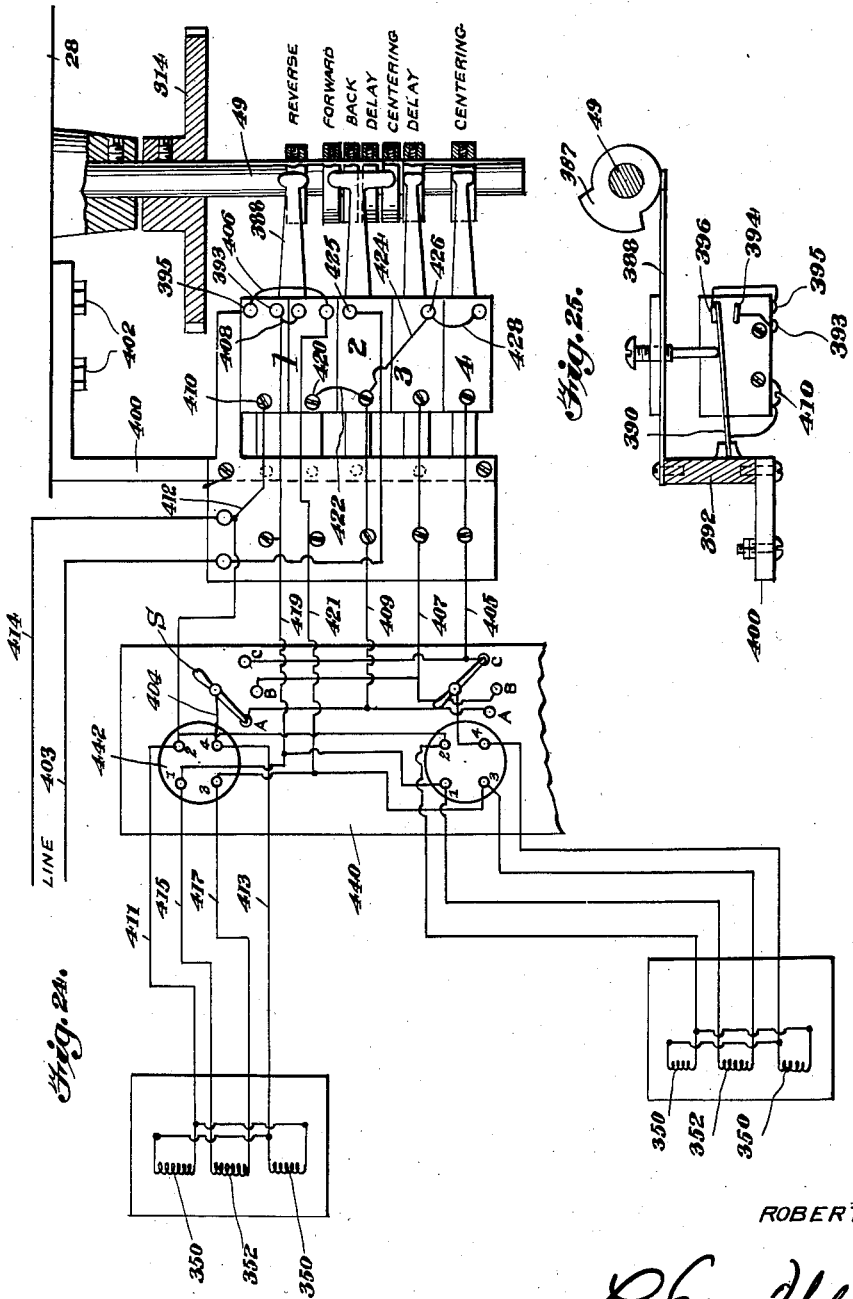
Inventor
ROBERT H. JOHNSON
By L. Edw. Flaherty
Attorney Patented June 4, 1940

2,203,572

UNITED STATES PATENT OFFICE 2,203,572

STRIPING OR BANDING MACHINE

Robert H. Johnson, Morgantown, W. Va.

Application August 25, 1936, Serial No. 97,823

34 Claims. (Cl. 91—12)

The present invention relates to a striping or banding machine, and more particularly to a machine of this character which is especially adapted for ornamenting plates and the like, but it is understood, of course, that a machine of this character may be used for striping or banding other types of receptacles, the present application being an improvement over the subject matter of our application Serial No. 707,958, filed January 23, 1934.

One of the objects of the present invention is to provide a striping or banding machine of this character having one or more applicator stations, which are adapted in a novel manner to apply a stripe or stripes of varying widths and colors to the work.

A still very important object of the invention is to provide a novel applicator station in combination with a rotatably mounted work-carrying table which automatically upon the indexing of the work therewith applies in a novel manner a stripe or stripes of varying widths to the work.

A further important object of the invention will be found to reside in the novel arrangement and construction of the device which permits of the use of a plurality of stations for applying successively to the work stripes of the same or varying widths.

A still further important object of the invention is to provide a novelly constructed striping station especially adapted for applying stripes or bands of varying widths to plates or the like which is automatically controlled.

Figure 3:
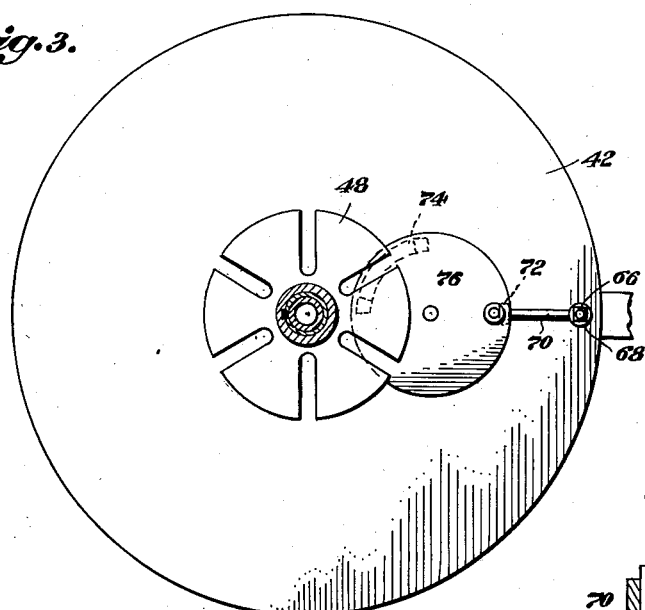
Figure 4:
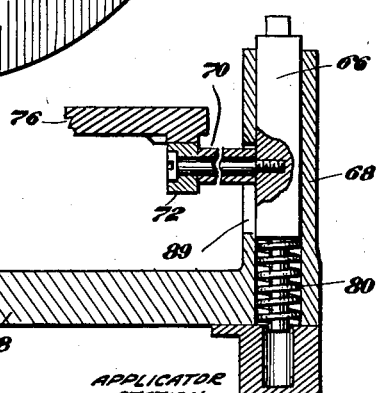
Figure 5:
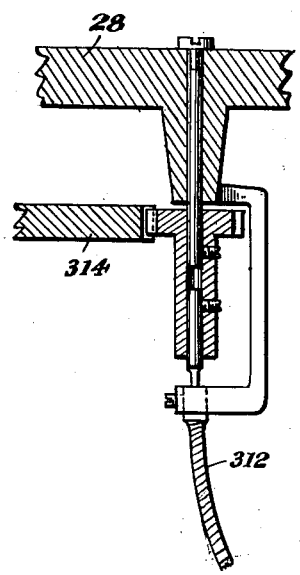

All of the foregoing and still further objects and advantages of the invention will become apparent from a study of the following specification, taken in connection with the accompanying drawings, wherein like characters or reference designate corresponding parts throughout the several views, and wherein:

Figure 1 is a top plan view of the striping machine, showing one of the chucks in indexing position, Figure 2 is a vertical sectional view of Figure 1, Figure 3 is a top plan view of the lower table, with the upper revolving table removed therefrom, Figure 4 is a detail vertical sectional view of the mechanism for locking the revolving table periodically in position, Figure 5 is a fragmentary detail view partly in section, illustrating the manner in which the flexible shaft for driving the traversing mechanism is connected, Figure 6 is a fragmentary vertical sectional view of the vacuum controlled chuck showing the centering device secured to the table for centering the work or plate held in position by the chuck, Figure 7 is a fragmentary front elevational view of Figure 6, Figure 8 is a top plan view of one of the striping stations illustrating the position of the chuck with respect thereto when in indexing position, Figure 9 is a side elevational view of the striping station, Figure 10 is a front elevational view of the striping station, Figure 11 is a fragmentary top plan view of the striping station illustrating the position of the traversing mechanism in its outermost position, Figure 12 is a similar view illustrating the position of the traversing mechanism in its inner position, Figure 13 is a detail vertical cross-sectional view of the traversing mechanism, Figure 14 is a perspective view thereof, Figure 15 is a fragmentary front elevational view, partly in section, of the revolving disk carrying the paint container, Figure 16 is a horizontal sectional view of Figure 15 taken on line 16—16 thereof looking in the direction of the arrows, Figure 17 is a top plan view of the combined electrical and vacuum actuated motor, Figure 18 is a fragmentary detail top plan view of the valve controlling mechanism, Figure 19 is a side elevational view of the applicator station, Figure 20 is a horizontal sectional view of the pumping device for pumping the paint to the applicator wheel, Figure 21 is a vertical sectional view of the pump, Figure 22 is a vertical sectional view of Figure 21 taken on line 22—22 thereof, Figure 23 is a horizontal sectional view of Figure 19 taken on line 23—23 thereof, illustrating the bearing mechanism on which the applicator wheel is rotatably mounted, Figure 24 is a schematic wiring diagram of the control, and Figure 25 is a vertical sectional view of the switch mechanism which is controlled by the cam.

Figure 26:
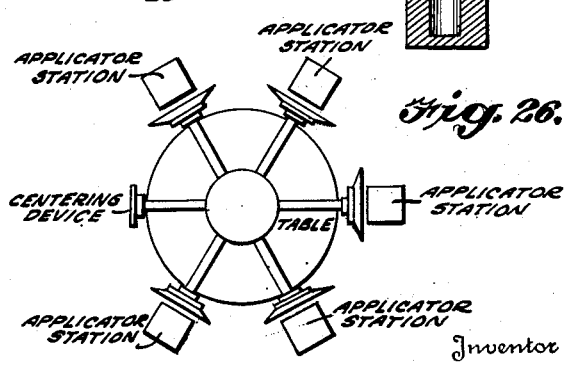

Figure 26 is a schematic plan view showing the arrangement of a plurality of applicator stations around the table.

In the accompanying drawings, wherein, for the purpose of illustration, there is shown a preferred embodiment of the invention, the reference numeral 26 generally designates the supporting structure somewhat similar in construction to the supporting structure shown in our application Serial No. 707,958, filed January 23, 1934.

The supporting structure, as shown in Figures 1 and 2, includes a stationary table 28 which is mounted on suitable legs 30 and is provided with a centrally located upstanding rotatable tubular shaft 32. A hollow shaft 34 is rotatably mounted in the shaft 32 and supported at its lowermost end through the medium of the cross-member 37 secured to the legs 30. To the shaft 34 there is secured a gear 36, which gear is driven by means of the pinion gear 38 through the medium of the motor 40.

Fixed on the upper end of the tubular shaft 32 is a rotary horizontal table 42 in which radial vacuum controlled chucks 44 are journaled in upstanding bearings 46. To the tubular shaft 32 there is keyed a Geneva gear mechanism 48, which, as clearly illustrated, is disposed between the support and the rotary horizontal table 42. It will thus be seen that the rotary table 42 is intermittently rotated through the medium of the Geneva gear mechanism 48, which gear mechanism is rotated by means of the electric motor 50. To the upper end of the hollow vertical shaft 34, which extends rotatably through the shaft 32, there is secured a beveled gear 52 which drives the beveled gears 54 secured to the ends of the chucks for effecting rotary movement of the chucks. A manifold 56 on the upper end of the hollow shaft 34 connects the vacuum supply controlling the vacuum actuated chuck to the vacuum pump through the medium of the conduits 58. As clearly illustrated, the vacuum pump is connected to the hollow shaft 34 through the medium of the conduit 60 and the gland 61 secured to the lower end portion thereof. It will be seen, as illustrated in Figure 1, that the intermittently rotated table 42 is provided with a plurality of spacedly arranged radial chucks, the table on the underneath side thereof below each chuck having a socket 64 for the reception of the spring actuated locking bolt 66 mounted on the platform 28. As illustrated in Figure 4, the bolt 66 is slidable in the cylinder 68 which rises from the platform 28. Projecting laterally from the bolt 66 is an arm 70 having journaled thereon a roller 72 for engagement by a cam 74 on the lower side of the disk 76 of the Geneva gear mechanism 48. The arm 70 is operable in a vertical slot 89 in the cylinder 68, the arm being normally urged upwardly in operative position through the medium of the coil spring 80.

Referring now to Figures 2 and 6, it will be seen that the intermittently rotatable table 42 is provided with the upstanding bearings 46 in which there is rotatably mounted the hollow shaft 82 which is driven through the medium of gears 52 and 54. A bored shaft 84 is snugly slidable in the shaft 82, and is provided with a disk 86 on the outer end thereof, which disk is provided with a centrally disposed hollow screw threaded nipple 88 on the outer surface thereof. A head 90 is screw threaded on the nipple 88 and in combination with the plate 92 supports the vacuum cup 94. As clearly illustrated, the vacuum cup 94 is adapted to firmly secure the plate A removably on the supporting plate 92. The outer end of the hollow shaft 82 is threaded, and has screw threaded thereon a head 96 which is held in position by means of the collar 98. To the inner face of the head 96 there is secured a washer 100, which washer is adapted in the innermost position of the chuck to close the ports 102 communicating with the interior of the nipple 88 and the cup 94. The cup supporting member 104 is provided with a centrally located bore, which bore communicates the cup with the interior of the nipple 88. To the disk 86 there is secured an L-shaped resilient member 106, for limiting the outward movement of the supporting plate 92 and forming a frictional drive between the head 96 and the plate 92.

It will thus be seen that when the disk 86 is in the position illustrated in Figure 6, the washer 100 closes the ports 102, to the end that through the medium of the vacuum machine, and the bore in the shaft 84, the air is sucked out of the cup 94 creating a vacuum and firmly securing the bottom portion of the plate in position on the cup 94.

When it is desired to remove the plate A from the chuck, the operator pulls the plate outwardly, the shaft 84 sliding in the hollow shaft 82, the ports 102 being opened to atmosphere, thereby breaking the vacuum and permitting of the removal of the plate from the chuck.

At this point it is thought well to note that one or more stations of the machine is provided for loading and unloading of the ware, such as plates or the like, the remaining stations through the medium of the applicators which will be subsequently described, applying the stripes or bands of different characters in succession to the ware at the indexing thereof.

As illustrated in Figure 6, at the loading and unloading station there is provided a novel means for centering the ware, such as plates or the like. Obviously, it is necessary that the plate be properly centered on the chuck prior to the application of the stripe or band thereto, and this is effected through the medium of a novel automatically operated centering device. To the lower side adjacent the periphery of the support 28 at the loading and unloading stations there is securely fastened by means of bolts 110, or the like, an arm 112 which carries the centering mechanism. It will be seen that the lower portion of the arm 112 has an integral split sleeve 114 thereon for sliding and rotary adjustment of the shaft 116 supporting the centering device. The free end of the shaft 116 is similarly provided with a collar 121 permitting of the vertical adjustment of the supporting shaft 123 of the centering mechanism. Thus, the shaft 123 may be adjusted not only horizontally, but vertically, as well as in a rotary direction. To the upper end of the shaft 123 there is provided an integral collar 127 carrying the rotary shaft 125. On the inner end of the shaft 125 there is eccentrically mounted a roller 129, which roller contacts the periphery of the plate for effecting the centering thereof. The other end of the shaft 125 is provided with an arm 131, which arm through the medium of the link 133 is rotated by means of the electrically controlled vacuum actuated motor 134. As will be more fully hereinafter described, at the indexing of the respective chucks, at the loading and unloading station, the shaft 125 is automatically rotated, to the end that upon the placing of a plate A on the chuck, the same is automatically centered.

It will thus be seen that intermittent rotation of the table 42 is effected through the medium of the Geneva gear mechanism 48, while at the same time constant rotation of the chucks carrying the ware is effected through the medium of the shaft 34.

Referring now to Figure 2, as clearly illustrated, there is secured to the support 28 an applicator station generally designated by the reference numeral 115. While there is shown in the drawings only one of such applicator stations, it is to be understood that a plurality of such stations may be, and are, employed for applying stripes or bands of different widths and colors to the ware as the same is intermittently rotated by means of the table to the different stations. To the lower side of the table 28 the applicator station is secured by means of the arm 118, which arm is provided with a split collar 120 for adjustably supporting the rod 122. The rod 122 has an integral L-shaped support 124 on its outer end on which there is slidable vertically the L-shaped carriage 126. It will be seen that the carriage 126 is adjustable vertically with respect to the member 124 by the crank arm 128. Upon the carriage 124 there is adjustably slidable the applicator supporting table 130. Through the medium of the crank arm 132 this table 130 may be horizontally adjusted with respect to the chuck carrying the ware. At the same time, the table 130 is pivotally adjustable on the carriage 126 through the medium of the screw connection 131. Clearly, therefore, the table 130 may be adjusted with respect to the chucks and the work vertically, horizontally in both directions, and rotatably. On the upper surface of the table or support 130 as shown in Figure 9, are upstanding pillars 140, which pillars support or carry the spider 144 in which the motor for rotating the table is mounted. The table 146, as illustrated in Figure 15, is rotatably journaled in a bearing 148 and has on its lower side thereof an armature 150, of the synchronous electric motor. The electric motor is supplied with electric energy through the conductors 152 and while there is shown for the purpose of illustration the well known type of electric motor for driving the disks of phonographs, it is to be understood, of course, that any type of motor or driving means may be employed. A paint container 158 is securely fastened for rotary movement on the upper surface of the table 146, and, as clearly illustrated in Figure 19, has arranged therein a rotary pump 160. It will be observed that the pump is of the rotary gear type, as shown in Figures 19 and 20, and is supported within the container by the depending arm 162 secured to the lateral support 164 mounted on the upstanding member 166 of the table. Rotation of the gears and operation of the pump 160 is effected by the arm 168 which is rotated by means of the pin 170 eccentrically disposed in the container. Thus, upon rotation of the table 146, the actuating arm 168 is rotated to effect a pumping operation of the pump 160 to force the paint from the container 158 through the hose connection 172 to the applicator wheel. At the same time, it is to be observed that the depending pump supporting arm 162 upon rotation of the container brings about and causes a thorough mixing of the paint therein. While any type of pump may be employed, for the purpose of illustration there is shown the well known gear type which includes a casing 180 having rotatably secured therein meshing gears 182 and 184.

The support 130 adjacent the sides at the front portions thereof have upstanding supports 190. These supports 190 have through the medium of the bolts 192 arms 194 secured thereto in which there is slidably mounted the traversing rod 196. As shown in Figure 8, an arm 198 is securely fastened to the traversing rod 196 and is slidably and rotatably adjustable thereof for carrying the upstanding applicator arm 199. The applicator arm support 198 is connected to the arm 199 by means of the screw bolt 200, permitting of a rotary adjustment of the arm 199 with respect to the arm 198, thereby permitting of the applicator wheel to be adjusted in this respect in relation to the surface of the ware.

As illustrated in Figure 23, the applicator wheel is rotatably mounted on a novelly constructed bearing carried by the arm 202 securely fastened to the upper end of the arm 199. Referring to Figure 23, wherein this bearing is shown in detail, it will be observed that the spindle 210 is screw threaded in the arm 202 and is frusto-conical in shape at its outer end, merging into a reduced cylindrical end portion. Upon the spindle 210 a similarly shaped bore is provided in the hub 212 which carries the applicator disk 214. The spindle 210 is provided with a longitudinally extending screw threaded bore into which there is screw threaded the retaining bolt 216 having a frusto-conical shaped head and which is received in the tapered end of the hub 212.

Obviously, when the hub 212 is placed on the spindle 210 for rotary movement thereon, the amount of play may be adjusted through the medium of the screw bolt 216, and at the same time a vernier adjustment may be effected and locked through the medium of the set screw 220 which is screwthreaded into the threaded bore in the spindle through the contacting of its inner end with the inner end of the bolt 216. The applicator disk 214 is secured to the hub 212 through the medium of the plate 224 which is screw threaded to the hub by the screw bolt 226. It is to be noted that this novel construction permits of the easy removal of an applicator wheel from the hub for cleaning purposes or if so desired to replace or place wheels of larger or smaller sizes thereon.

The applicator wheel is rotated by the flexible shaft 230 which is driven through a variable speed mechanism connected to the electric motor 323. Referring to Figure 8, it will be noted that the electric motor 232 is secured to its supporting arm 234 on which arm 234 there projects an arm 236 having a pivotally mounted arm 238 thereon. On the free end of the arm 238 there is rotatably mounted a disk 240 to which one end of the flexible shaft is connected. The disk 240 is rotated by the contacting thereof with the disk 242 secured to the drive shaft of the motor 232. The disk 240, as will be observed, is normally maintained in driving contacting relationship with the disk 242 of the motor shaft by the coil spring 244. Thus, the applicator wheel through the medium of the motor, the friction drive, and the flexible shaft, is constantly rotated. However, in order to maintain the speed of the applicator wheel at the same speed of rotation of the ware upon contacting of the applicator wheel thereto, the friction drive mechanism permits of a slipping action to enable the applicator wheel to travel at the same speed of the ware, it being apparent that when the applicator wheel is removed from the ware, the same is constantly rotated by the motor preventing the drying of the paint thereon. Obviously, if so desired, the wheel may be directly rotated by the ware.

On one side of the arm 202, as shown in Figure 19, below the applicator wheel there is secured a trough 250, which trough in combination with the overhanging stationary trough 252 supported by the arm 254 returns the paint from the applicator wheel to the container. The bottom portion of the trough 250 is apertured, and receives the upper end of the hose 172 for supplying the paint to the applicator wheel upon the pumping action of the pump. Adjacent the upper end of the arm 202 there is secured a pair of laterally extending spaced scraper supports 260. The scraper 262 which is provided with a substantially rectangular-shaped recess therein receives a portion of the periphery of the wheel in assuming a straddling relation with respect thereto and is carried by the lower arm 260. A set screw 264 enables the lower arm 260 to be adjusted with respect to the upper arm for adjusting the scraper 262 with respect to the applicator wheel to control the amount of paint carried by the applicator wheel and consequently the amount of paint applied to the ware.

It might be noted at this point that the hose 172 has a pipe 171 secured thereto extending through an aperture in the trough 250, the free paint emitting end being adjustable spacedly relative to the periphery of the wheel for controlling the amount of fluid supplied to the wheel.

Swinging movement of the arm 199 and consequently the applicator wheel is effected by means of the crank arm 270 secured to the projected end of the traversing bar 196. This movement of the rod 199, the relative position of the applicator wheel with respect to the work, and the period of time the applicator wheel is in engagement with the ware is controlled through the medium of the vacuum motor 280. The vacuum motor may be any of the well known types of vacuum motors such as are employed for driving windshield wipers in motor vehicles or in fact any driving mechanism and is provided with an actuating arm 282 connected by means of the link 284 to the arm 270, whereby upon actuation of the vacuum motor, the link effects a forward and return horizontal movement of the applicator wheel with respect to the ware. The applicator wheel being held in position against the ware by the coil spring 286. The vacuum motor is connected with a source of vacuum supply, not shown, through the conduit 288, and, as clearly shown in Figure 17, has its valve element 290 electrically controlled by the electro magnets which will be more fully hereinafter described.

It has thus been seen that the pivotal movement of the applicator wheel with respect to the ware may be effected to vary the contacting period of the applicator wheel to the ware.

In order to permit of bands or stripes of different widths to be applied to the ware, there is arranged a novel mechanism for effecting the traversing of the applicator wheel with respect to the ware. To the under side of the support 130 as shown in Figures 13 and 14, there is securely fastened a laterally extending supporting structure 294 on which there is mounted the mechanism for effecting the traversing of the traverse rod 196. Mounted on this support adjacent the projecting end portions of the traversing rod 196 there is a substantially U-shaped member 298 having one leg shorter than the other thereof and on which there is pivotally mounted in overlapping relationship the arms 300 and 302. The lower arm 302 at substantially its mid point on the underneath side thereof has pivotally mounted a roller 304, which roller is in contacting relationship with a cam 306 mounted on the gear 308 which is revolved through the medium of the pinion gear 310 in mesh therewith. It will be seen, as shown in Figure 2, that the gear 310 is rotated by the flexible shaft 312 driven by means of the gear 314 from the shaft of the disk 76 of the Geneva gear mechanism.

On the upper arm 300 there is arranged a slidable collar 316 having rotatably secured on the underneath side thereof a roller 320, which roller is in contacting relationship with the adjacent side of the lower pivoted member 302. Referring now to Figure 13, it is seen that the projected end portion of the traversing rod 196 is provided with an inwardly directed bore in which there is slidable a bolt 319. The arm 270 has a recess therein, in which there is slidable a guide member 324, the upper end of the guide member being apertured and receiving the screw bolt 319. The upper end of the guide member, as illustrated, is secured to the bolt through the medium of the nut 326 and a lock coil spring encircles the bolt 319 and is disposed between the bolt and the adjusting nut 330, to the end that upon adjustment of the adjusting nut 330 the position of the traversing rod may be regulated with respect to the traversing mechanism, and consequently the relative position of the applicator wheel with respect to the ware may be controlled. This is in the nature of a vernier adjustment permitting of minute setting of the rod and the consequent setting of the applicator wheel.

As is illustrated, the pivotally mounted arm 300 abuts the free end of the screw member 319, whereby, upon movement of the member 300 through the medium of the pivotal member 302, a traversing or horizontal sliding movement of the rod 196 is effected. Upon rotation of the gear 310 and a consequent rotation of the gear 308, the cam effects a movement of the pivotal member 302 and at the same time a corresponding movement of the member 300. Of course, the travel of the member 302 upon rotation of the cam 306 through the contacting of the roller 304 is substantially the same in one cycle, the travel of the member 300 being controlled by the positioning of the roller and collar 316 on the member 300 with respect to the member 302.

Referring to Figure 11, it will be seen that the coil spring 197 connected at one end to the arm 194 and at the other end to the collar 340 on the traversing rod, normally urges the traversing rod into contacting relationship with the pivotal member 300.

As hereinbefore set forth, the traversing mechanism is controlled through a direct connection with the Geneva gear mechanism, to the end that when the chuck carrying the ware reaches an applicator station and in indexing position, the shape of the cam is such that a traversing movement of the rod 196 is effected, to bring about a traversing movement of the applicator wheel with respect to the ware so that bands of varying widths may be applied to the ware. Of course, the width of the band may be varied and controlled by regulating the position of the collar 316 on the member 300, which, of course, varies the amount of traversing travel of the rod 196, and, of course, the applicator wheel. When so desired, the collar 316 may be moved to its outermost position which in effect maintains the traversing rod in stationary position, regardless of the rotating of the traversing mechanism and the cam.

Obviously, a plurality of such applicator stations may be positioned around the table for painting bands on the same plate or other ware of different widths; one applicator station may be regulated to place what is commonly called a hair line, while another may be set for a broad line, and still another for a narrower one, as desired, as well as bands of different colors.

Referring now to Figure 17, as illustrated, the applicator wheel is controlled by means of the vacuum motor 280, the valve 290 of the vacuum motor being actuated by means of the magnets 350 and 352. As clearly shown in Figure 17, the magnets 350 are supported in spaced relationship on a supporting member 354 and have disposed therebetween the magnet 352 which is pivotally mounted on the pin 356. To the magnet 356 there is secured an actuating arm 358, which is received in a substantially U-shaped recess 360 in the pivotally mounted valve member 362. The vacuum motor is of the usual construction and provided with three ports 365, which are controlled by the valve member 362 for controlling the operation of the motor. The motor is connected by means of the conduit 370 to a vacuum source of supply. It will thus be seen that upon the proper energization of the respective magnets the timing and speed of movement of the applicator wheel with respect to the work can be controlled. In the same manner the centering device is controlled through the medium of a similarly constructed and actuated vacuum motor 134. Obviously, any kind of control mechanism may be employed, the specific mechanism being merely shown for the purpose of illustration.

Referring now to Figures 24 and 25, there is schematically illustrated the wiring diagram for controlling the energization of the magnets 350 and 352 of the vacuum motors 280 and 134 controlling the operation of the applicator wheel and the centering device, respectively. As clearly shown, in Figure 2, on the shaft 49 which drives the disk 76 of the Geneva gear mechanism, there is provided a plurality of cams. One set of cams designated on the drawing are for controlling the magnet of the vacuum motor which controls and actuates the applicator wheel. These cams are designated as reverse, forward, back, delay, centering, and delay, there being provided a separately spaced cam for the centering. As illustrated, the cams actuate their associated respective arms 388 which, as shown in Figure 25, move the spring contact members 390 secured to the support 392 of the switches to their associated stationary electrical contacts 394. Normally the spring contact 398 of each switch is in electrical contacting engagement with the other spaced stationary electrical contact 396. The respective supports 392 of the switches designated 1, 2, 3 and 4, which are of the same construction, are mounted upon a bracket 400, which bracket is suspended from the support 28 through the medium of the bolt 402. It will be seen that the switch 1 which is actuated by its respective cam 387 comprises two of such switch members as illustrated in Figure 25. As illustrated, the upper and lower contacts 395 and 393 are respectively connected together through the medium of the conductors 406 and 408. That is to say, the upper contact of one switch is connected to the lower contact of the other, and vice versa.

The terminal 410 of one of the pair of switches comprising switch 1 is connected by means of a conductor 412 to the line terminal 414. The other terminal 420 is connected by means of conductor 422 to a similar terminal on switch 2. This terminal is further connected by means of conductor 424 to terminal 426 of switch 3, which terminal in turn is connected by means of conductor 428 to one of the contacts of switch 4.

As hereinbefore set forth, in the operation of the machine, if so desired, a plurality of such applicator stations may be provided. However, for the purpose of illustration, only one of such applicator stations has been shown. It is to be noted that this master control is arranged to control automatically the operation of each applicator station. In this connection there is provided a master switchboard 440, which has one male switch receiving socket 442 for each applicator station employed. That is to say, the schematic diagram illustrated in Figure 24 shows the electrical connections for only one applicator station. However, the switchboard 440 is provided with one female switch receptacle 442 for each station, all of the female switch receptacles, of course, being connected in parallel adapted to receive the male plugs 444 of the magnetic control shown in Figure 17 of each vacuum motor, controlling the operation of the applicator arm. Of course, it is to be noted that one of such male plugs is provided for energizing the magnets controlling the operation of the vacuum motor for the centering device, the centering device being located at the loading and unloading station or stations.

Each electrical switch 442 has four male receiving electrical sockets, numbered respectively 1, 2, 3, and 4, and there is provided a pivotally mounted switch arm S having associated therewith three cooperating spaced stationary electrical contacts A, B, and C. As illustrated in Figure 24, the windings 350 of the stationary magnet are connected in parallel and respectively to contacts 2 and 4 of the switch receptacle 442. The free end terminals of the windings 352 of the centrally disposed movable magnet are respectively connected by conductors 415 and 417 to conductors 1 and 3 of the switch receptacle 442. Terminal 1 of the switch 442 is connected by means of conductors 419 to terminal 393 of the switch 1. Terminal 3 of switch 442 is connected by conductor 421 to a terminal which is connected to conductor 406 of switch 1. Terminal A of the switch S is connected by conductor 409 to a terminal connected to conductor 422 of switch 2, and terminal B of the switch is connected by conductor 407 to the movable contact arm of switch 3, while terminal C of the switch is connected by conductor 405 to the movable contact arm of switch 4. The other conductor 403 of the source of supply is connected to the stationary contact 425 of switch 2, while switch arm S is connected to terminal 4 of switch receptacle 442 by conductor 404.

Thus, depending upon the position of the switch S, whether on its associated contacts A, B, or C, the period of time of the engagement of the applicator wheel to the ware can be controlled. For example, the pair of switches 1, which are controlled by the arm 388 of the reverse cam, control the direction of flow of the current through the coil 352. With the switch arm S on contact A, it will be seen that coils 350 are energized in such a manner that they always have the same polarity, the movement of the valve being effected through the reversing of the flow of current and consequently the reversal of polarity of the coil 352. With switch S on contact A, the reverse cam actuates the pair of switches 1 to control the direction of flow of current through coil 352. For example, if the applicator arm is in a backward inoperative position, the contacting of the reverse cam with its cooperating arm moves the pair of switches 1 into position to energize coil 352 to cause the current to flow in an opposite direction. This cam is so arranged to actuate switches 1 to place the same in position for the proper energization in one direction or the other of coil 352 during the indexing. Upon the ware reaching the indexed position, switch 2 is actuated by the forward cam, the operation thereof energizing magnets 350 and magnet 352, thereby moving the valve mechanism of the vacuum motor causing the applicator arm to be moved to a forward position into contacting engagement with the work. It will be seen that if the reverse, delay, and centering cams which also cooperate with the arm of switch 2 move into contacting engagement with their cam arms, nothing will happen for the reason that the cam operating switches 3 and 4 are not in the electrical circuit. Likewise, the centering cam is not effective. The cams are so arranged that upon substantially a ⅞ completion of the work cycle the reverse cam again actuates switch 1 to place the winding of magnet 352 in a circuit for reversal of flow of current therein, and consequently a reversal of polarity thereof. Then, upon actuation of switch 2 through the contacting of its cam arm with the back cam, coil 352 is energized in a reverse direction, moving the valve control mechanism of the vacuum motor to a position to move the applicator arm to its backward inoperative position. The machine then indexes.

With the switch arm S on contact B, the reverse cam actuates switches 1 in the same manner as previously described with respect to the switch arm on position A. That is to say, during indexing, the reverse switch actuates switches 1, placing the winding 352 in position to be energized for a forward movement of the applicator arm. Position B of the switch arm S is arranged to permit of a delay of the movement of the applicator arm after the indexing position into position with the ware. It might be noted at this time that the reason for having a quick and a delayed action of the applicator wheel with respect to the work is to permit of, for example, the engagement of the applicator wheel with the ware for a longer period to permit of making stripes of varying widths, and also to limit the period of contacting of the applicator wheel with the ware for fine stripes, it being obvious that the period of time and engagement of the applicator wheel with the work for making fine stripes requires a much shorter period than in the case of making wide bands and the like. Therefore, when the switch arm is on switch B, even though switch 2 is in position for forward energization of the coil 352, coils 350 cannot be energized because of the actuation of switch 3 which is actuated by the delay cam. For example, upon a completion of about one-half of an operating or working cycle at the indexed position, switch 2 is closed by the delay cam energizing coil 352, as well as coil 350, thereby operating the valve of the vacuum motor to move the applicator wheel to a forward position. This operation is effected for the reason that the delay cam operating switch 3 has been permitted to close and make contact. The applicator wheel then engages the work for the remaining portion of the cycle, and upon completion of the cycle the reverse cam reverses the position of switch 1, the back cam actuating switch 2 reversing the current in coil 352, coils 350 having the same polarity moves the valve mechanism to a position to reverse or move the applicator wheel to an inoperative backward position.

With the switch arm on contact C, the energization of the magnets is effected in substantially the same manner as previously described, with the exception that the cam operating switch 4 operates through a smaller fraction of the work cycle permitting of the applicator wheel to engage the work for only a small fraction of the cycle thereof. In the operation of the machine the applicator wheel is controlled normally in only two positions of the switch S, namely, A and B, while position C of the switch is used for operating the centering device.

It is thought advisable to again call attention to the fact that Figure 24 merely illustrates the schematic wiring diagram for the operation of only one applicator station, and the centering device. As previously set forth, there are provided as many male receiving receptacles 442 as there are stations employed, to the end that for example if there are four applicator stations and one station for loading and unloading, at which the centering device is arranged, station 1 may be employed for placing wide bands on a plate or the like, and if such is the case, the switch arm S for that station will be positioned on contact A, whereby the applicator wheel engages the plate throughout substantially the work cycle.

At the same time, another of the remaining stations may have the switch arm in position A or position B, depending upon the type of band desired, to the end that the respective stations may be used for successively placing a plurality of different types of bands on the same piece of work.

As clearly illustrated, the traversing mechanism is actuated from the Geneva gear mechanism through the gear 314 and the flexible shaft 312 and normally rotates the gear 308 carrying the cam 306. When at a particular station it is desired to place a band of a particular width on a piece of ware such as a plate or the like, the collar 316 is set at a predetermined position on the arm 300 to control the traversing movement of the rod 196 through the medium of its movement thereof by the cam 306, arm 302, and arm 300. Obviously, for a fine adjustment the same may be obtained through the medium of the adjusting nut 330. As clearly illustrated, when the plate or ware reaches the indexed position in front of the applicator station, the cam control mechanism operates the vacuum motor moving the applicator arm to a forward position whereupon the applicator wheel engages the plate. At the same time, the rotation of the cam 306 through the medium of the gear 308 contacts the roller 304 moving the arm 302 inwardly into contacting engagement with the roller 320 effecting a traversing movement of the rod 196 through the medium of the arm 300, to the end that the applicator wheel traverses the plate or ware placing a band or stripe of predetermined width thereon. Upon completion of the cycle the arm is brought to reverse position by the electrically actuated vacuum motor, and at the same time the cam 306 has completed its cycle permitting of the traversing rod through the medium of the coil spring 197 to be returned to its original position, it being noted that at the same time the arms 300 and 302 through the contacting with the free end of the traversing rod 196 and the action of the coil spring 197 are returned to their original positions. The ware is then moved to another station where, if so desired, a stripe of the same character or different character adjacent the first stripe may be placed thereon by the applicator wheel. The ware moves continuously and intermittently in this manner until the same reaches the unloading station, whereupon the ware is removed and another piece of ware placed thereon, the same being properly centered by the automatic operation of the centering device previously described. It might be noted in this connection that the operator places the plate or other ware in position against the chuck, the edge thereof, as clearly illustrated in Figure 6, resting upon the eccentrically mounted roller 128 and through the medium of the vacuum motor 134, which is controlled by the previously described mechanism, the roller 128 is rotated through a cycle, moving the plate to its proper centered position. Upon the proper centering through the cycle of operation of the roller 128, the roller gradually leaves the periphery of the plate, whereupon the chuck is moved to an indexed position in front of the first applicator station. As illustrated, the first applicator vacuum motor and the centering vacuum motor are wired in parallel, so that roller 28 is raised and lowered in unison with the inward and outward movement of the first applicator. Of course, any other sequence of operation may be obtained if so desired.

Obviously, the predetermined positioning of the collar 316 on the arm 300 enables bands or stripes of varying widths to be placed on the ware, it being noted that when the collar 316 is pushed to its outermost position, the rotation of the cam 306 does not effect a movement of the arm 300, to the end that this setting of the collar 316 permits the applicator wheel to be used for placing stripes of a hairline character on the ware, the traversing rod and the applicator wheel remaining in a stationary position.

While there is shown for the purpose of illustration a preferred embodiment of the invention, it is to be specifically understood that it is capable of various changes and modifications without departing from the spirit and scope thereof, and it is intended, therefore, that only such limitations shall be imposed thereon as are indicated in the prior art or the appended claims.

What is claimed is:

1. An ornamenting machine of the class described comprising a rotatably mounted table, means intermittently rotating said table, a plurality of chucks on said table for supporting the ware, a plurality of spacedly disposed applicator stations adjacent said table, a centering device adjacent the table for centering the ware on a chuck as it registers therewith and control means actuated by the means intermittently rotating said table for controlling the operation of said applicator stations and said centering device.

2. An ornamenting machine of the class described comprising a rotatably mounted table, a plurality of chucks on said table for supporting the ware, a plurality of applicator stations adjacent said table including a pivotally mounted paint applicator, means intermittently rotating said table for indexing said chucks with said applicator stations, centering means adjacent the table for centering the ware on a chuck as it registers therewith, and control means actuated by the means intermittently rotating said table for controlling the operation of the pivotally mounted paint applicator with respect to the ware.

3. An ornamenting machine of the class described comprising a rotatably mounted table, a plurality of ware supporting chucks on said table, means for rotating said chucks, a plurality of applicator stations disposed around said table, means intermittently rotating said table and indexing said chucks with said applicator stations, a centering device adjacent said table for centering the ware on a chuck as it registers therewith, each of said applicator stations including a pivotally mounted paint applicator, means for effecting a traversing of the applicator with respect to the ware on the chucks, and control means actuated by the means intermittently rotating said table for controlling the movement of the applicator into and away from said ware.

4. An ornamenting machine of the class described comprising a support, a rotatably mounted table on said support, a Geneva gear mechanism for intermittently rotating said table, a plurality of ware supporting chucks on said table, means for rotating said chucks, means for driving said Geneva gear mechanism, a plurality of applicator stations spacedly disposed adjacent and around said table, each of said applicator stations including a pivotally mounted paint applicator, means for effecting a traversing of the ware applicator with respect to the ware on the chucks, and control means actuated by the Geneva gear mechanism for controlling the operation of the pivotally mounted applicators.

5. An ornamenting machine of the class described comprising a supporting structure, a table rotatably mounted on the supporting structure, chucks rotatably mounted on the table for supporting the ware, means for rotating said chucks, means for intermittently rotating the table, and an ornamenting station adjacent to the table and engageable successively with the ware when the table is stationary, said ornamenting station including a paint receptacle, carried thereby, a pivotally mounted and transversely movable applicator supporting arm, a paint applicator on said arm, means for conveying the paint from the receptacle to the applicator, means controlled by the means intermittently rotating the table for effecting a transverse movement of the applicator arm, and means controlled by the intermittently rotating means for controlling the pivotal movement of the applicator arm.

6. An ornamenting machine of the class described comprising a supporting structure, a table rotatably mounted on the supporting structure, chucks rotatably mounted on the table for spinning the ware, means for rotating said chucks, means for intermittently rotating the table, and an ornamenting station engageable successively with the ware when the table is stationary, said ornamenting station including a paint receptacle, a pivotally and transversely movable applicator arm, a rotatably mounted ware applicator on said arm, means for conveying the paint from the receptacle to the applicator, means for rotating said applicator, driving means interposed between the means for rotating the applicator and the applicator, means for effecting a pivotal movement of the applicator arm to move the applicator into position against the ware carried by the chucks and out of engagement therewith, adjustable means for effecting a traversing of the applicator with respect to the ware, and control means actuated by the means intermittently rotating the table for controlling the traversing and pivotal movement of said applicator arm.

7. An ornamenting machine of the class described comprising a supporting structure, a table rotatably mounted on the supporting structure, chucks rotatably mounted on the table for rotating the ware, means for rotating said chucks, means for intermittently rotating the table, and an ornamenting station adjacent to the table and engageable successively with the ware carried by said chucks, means for adjusting said ornamenting station with respect to the ware carried by the chucks in a vertical pivotal and horizontal position, said ornamenting station including a rotatably mounted table, means for rotating said table, a paint receptacle carried by said rotatably mounted table, a rotatable and transversely movable rod carried by the station adjacent the paint receptacle supporting table, an applicator arm adjustably mounted on said rod, a rotatably mounted applicator wheel on the free end of said arm, means for rotating said applicator wheel, means for conveying the paint from said receptacle to the periphery of said wheel, means for rotating said rod to swing said applicator arm to effect an engagement of the applicator wheel with the ware carried by the chucks, resilient means for returning said arm to its normal position, means engaging one end of said rod for moving said rod transversely to effect a traversing of the applicator wheel with respect to the work, said means being actuated by the means intermittently rotating the chuck supporting table.

8. An ornamenting machine of the class described comprising a supporting structure, a table rotatably mounted on the supporting structure, chucks rotatably mounted on the table for rotating the ware, means for rotating said chucks, means for intermittently rotating the table, and an ornamenting station mounted adjacent to the table for cooperation with the ware carried by the chucks when the table is stationary, said ornamenting station including a rotatably mounted paint receptacle, means for rotating said receptacle, a rotatable and transversely slidable rod, an applicator arm adjustably mounted thereon, an applicator wheel rotatably mounted on said applicator arm, a pump, a conduit connected to said pump for communicating the paint from the interior of said receptacle to the applicator wheel, an arm on said rod for effecting rotation thereof to swing the applicator wheel into engagement with the ware carried by the chucks, resilient means normally urging said applicator wheel toward engagement with the ware, adjustable means for effecting a sliding movement of said rod for traversing the applicator wheel with respect to the ware when the same is in engagement therewith, means for periodically actuating said last-named means, and means for actuating the arm to rotate the rod to bring the applicator wheel into position against the ware.

9. In an ornamenting machine of the class described, an applicator station comprising a support, a rotatably mounted paint receptacle on said support, means for rotating said receptacle, a rotatably and slidably mounted rod on said support, an applicator support secured to said rod, an applicator mounted on said support, means for conveying the paint from said receptacle to said applicator, means for moving said applicator support to an operative position for engaging the applicator with the ware, and means for sliding said rod when the applicator is in engagement with the ware for effecting a traversing of the applicator with respect to the work.

10. In an ornamenting device of the class described, an applicator station comprising a support, a rotatably mounted paint receptacle on said support, means for rotating said receptacle, a rotatably and slidably mounted rod on said support, an upstanding applicator support adjustably secured to said rod, an applicator wheel rotatably mounted on said support, means for rotating said applicator wheel, means for conveying the paint from said receptacle to said applicator wheel, means for rotating said rod to move the applicator wheel into and out of engagement with the ware, and means for sliding said rod when the applicator wheel is in engagement with the ware to effect a traversing of the applicator wheel with respect to the ware.

11. In an ornamenting device of the class described, an applicator station comprising a support, a rotatably mounted paint receptacle on said support, means for rotating said receptacle, a rotatably and slidably mounted rod on said support, an applicator support secured to said rod, an applicator wheel rotatably mounted on said support, means for rotating said applicator wheel, means for conveying the paint from said receptacle to said applicator wheel, means for rotating said rod to move the applicator wheel into and out of engagement with the work, and adjustable means for sliding said rod when the applicator wheel is in engagement with the ware to effect a traversing of the applicator wheel with respect to the ware.

12. In an ornamenting device of the class described, an applicator station comprising a support, a rotatably mounted paint receptacle on said support, means for rotating said receptacle, a rotatably and slidably mounted rod on said support, an upstanding applicator support adjustably secured to said rod, an applicator wheel rotatably mounted on said support, means for rotating said applicator wheel, driving means interposed between the means for rotating said wheel and the wheel, means for conveying the paint from said receptacle for said applicator wheel, means normally urging said applicator support to an operative position, means for periodically moving said applicator support to a position where the applicator wheel engages the ware, and means for sliding said rod a predetermined distance when the applicator wheel is in engagement with the ware for effecting a traversing of the applicator wheel with respect to the ware.

13. In an ornamenting device of the class described, an applicator station comprising a support, a rotatably mounted paint receptacle on said support, means for rotating said receptacle, a rotatably and slidably mounted rod on said support, an upstanding applicator support adjustably secured to said rod, an applicator wheel rotatably mounted on said support, means for rotating said applicator wheel, driving means interposed between the means for rotating said wheel and the wheel, means for conveying the paint from said receptacle to said applicator wheel, means normally urging said applicator support to an operative position, means for moving said applicator support to a position where the applicator wheel engages the ware, a U-shaped member having one leg shorter than the other secured to said support adjacent one end of said rod, a pair of overlapping arms pivotally mounted on each of the upstanding arms of the U-shaped member, the free end of said rod being in engagement with the upper pivotally mounted arm, a roller slidable on said upper arm in contacting engagement with the lower pivotally mounted arm, a roller pivotally mounted on the lower arm at substantially the mid point thereof, a rotatably mounted arm in contacting engagement with said last-named roller, and means for rotating said cam to effect a predetermined sliding movement in one direction of the rod when the applicator wheel is in engagement with the ware for effecting a traversing movement of the applicator wheel with respect to the ware, and means for returning said rod to its original position.

14. In an ornamenting device of the class described, an applicator station comprising a support, a rotatably mounted paint receptacle on said support, means for rotating said receptacle, a rotatably and slidably mounted rod on said support, an applicator support secured to said rod, an applicator wheel rotatably mounted on said support, means for rotating said applicator wheel, a pump, a conduit communicating the paint from said pump to the applicator wheel, a scraper in straddling relationship to the periphery of said wheel for controlling the amount of paint carried thereby, operative means for moving said support to a position in which the applicator wheel engages the ware, and adjustable means for sliding said rod a predetermined distance in one direction when the applicator wheel is in engagement with the ware for effecting a traversing of the applicator wheel with the work, and means for returning the rod to its original position.

15. An ornamenting machine of the class described comprising a supporting structure, a table rotatably mounted on the supporting structure, chucks rotatably mounted on the table for supporting the ware to be ornamented by the machine, means for spinning said chucks, means for intermittently rotating the table, and an ornamenting station adjacent to the table and engageable successively with the ware when the table is stationary, said ornamenting station including a paint receptacle, a pivotally mounted and transversely movable applicator supporting arm, a paint applicator on said arm, means for conveying the paint from the receptacle to the applicator, means for effecting a transverse movement of the applicator arm, and means controlled by the intermittently rotating means for controlling the pivotal movement of the applicator arm.

16. An ornamenting machine of the class described comprising a supporting structure, a table rotatably mounted on the supporting structure, chucks rotatably mounted on the table for supporting and spinning the ware to be ornamented, means for spinning said chucks, means for intermittently rotating the table, and an ornamenting station adjacent to the table and engageable successively with the ware carried by said chucks, means for adjusting said ornamenting station with respect to the ware carried by the chucks in a vertical, pivotal and horizontal position, said ornamenting station including a rotatably mounted table, means for rotating said table, a paint receptacle carried by said rotatably mounted table, a rotatable and transversely movable rod carried by the station adjacent the paint receptacle supporting table, an upstanding applicator arm adjustably mounted on said rod, a rotatably mounted applicator wheel on said arm, means for rotating said applicator wheel, means for conveying the paint from said receptacle to the periphery of said wheel, means for rotating said rod to swing said applicator arm to effect an engagement of the applicator wheel with the ware carried by the chucks, resilient means for urging said arm to its working position, means engaging one end of said rod for moving said rod transversely to effect a traversing of the applicator wheel with respect to the work.

17. An ornamenting machine of the class described comprising a supporting structure, a table rotatably mounted on the supporting structure, chucks rotatably mounted on the table for supporting and spinning the ware, means for constantly spinning said chucks, means for intermittently rotating the table, and an ornamenting station adjacent to the table and engageable successively with the ware carried by the chucks, means for adjusting said ornamenting station with respect to the ware carried by the chucks in a vertical pivotal and horizontal position, said ornamenting station including a rotatably mounted table, means for rotating said table, a paint receptacle carried by said rotatably mounted table, a depending pump support in said receptacle adjacent the inner periphery thereof, a pump secured to the lower end of said support and driven by the receptacle, a rotatable and transversely movable rod carried by the station adjacent the paint receptacle supporting table, an upstanding applicator arm adjustably mounted on said rod, a rotatably mounted applicator wheel on said arm, means for rotating said applicator wheel, conduit means for conveying the paint from said pump to the periphery of said wheel, means for rotating said rod to swing said applicator arm to effect an engagement of the applicator wheel with the ware carried by the chucks, resilient means for urging said arm to its working position, and means engaging one end of said rod for moving said rod transversely to effect a traversing of the applicator wheel with respect to the work, and means for returning said rod to its normal position.

18. An ornamenting machine of the class described comprising a rotatably mounted table, means intermittently rotating said table, a plurality of chucks on said table for supporting ware, a plurality of spacedly disposed applicator stations adjacent said table, including a pivotally mounted paint applicator, means normally maintaining said applicator out of engagement with the ware carried by the chucks, means for moving said paint applicator into position against the ware when the table is stationary, means for effecting a traverse movement of said paint applicator with respect to said ware, and control means actuated by the means intermittently rotating said table for controlling the operation of the means actuating said applicator.

19. In an ornamenting device of the class described, an applicator station including an applicator, means for supplying paint thereto, and cam actuated automatic means for traversing said applicator with respect to the ware to obtain bands of different widths.

20. In an ornamenting device of the class described, an applicator station including a pivotally mounted applicator, means for supplying paint thereto, and cam actuated automatic means for traversing said applicator when the same is in engagement with the ware to obtain bands on the ware of different widths.

21. In an ornamenting device of the class described, an applicator station including a slidably mounted rod, an applicator arm secured thereto, an applicator on said arm, resilient means normally urging said rod in one direction, and means for sliding said rod predetermined distances in the other direction for effecting a traversing of the applicator with respect to the ware to obtain bands thereon of different widths.

22. In an ornamenting device of the class described, an applicator station including an applicator, and cam actuated means for traversing said applicator predetermined distances on the ware when the same is in engagement with the ware for obtaining bands thereon of different widths.

23. In an ornamentaing device of the class described, an applicator station including a paint receptacle, a rotatably and sliding mounted rod, an applicator support adjustably secured to said rod, an applicator mounted on said applicator support, means for conveying paint from the receptacle to said applicator, means for rotating said rod to move the applicator into and out of engagement with the ware, means urging said slidable rod in one direction, and means for sliding said rod in the opposite direction thereof when the applicator wheel is in engagement with the ware to effect a traversing of the applicator wheel with respect to the ware.

24. In an ornamenting device of the class described, an applicator station comprising, a rotatably and slidably mounted applicator support, an applicator secured to said support, means for supplying paint to said applicator, means for rotating said support to move the applicator into and out of engagement with the ware, means slidably urging said support in one direction and adjustable means for sliding said support in the opposite direction thereof when the applicator is in engagement with the ware to effect a traversing of the applicator with respect to the ware.

25. In an ornamenting device of the class described, an applicator station comprising, a rotatably and slidably mounted applicator support, an applicator arm secured to said support, a paint applicator on said arm, means for supplying paint to said applicator, means for rotating said support to move the applicator into and out of engagement with the ware, an adjustable cam means for sliding said support predetermined distances when the applicator is in engagement with the ware to effect a predetermined traversing of the applicator with respect to the ware to obtain bands of different widths thereon.

26. An ornamenting machine of the class described, comprising an intermittently movable work supporting means, means for actuating said movable work supporting means, an ornamenting station adjacent said work supporting means including a movably mounted applicator engageable with the work carried by the work supporting means when the work supporting means is stationary, and means controlled by the means actuating said work supporting means for actuating said movably mounted applicator.

27. An ornamenting machine of the class described, comprising an intermittently movable work supporting means, means for actuating said work supporting means, an ornamenting station adjacent said work supporting means including a movably mounted applicator, means for supplying paint to said applicator, said applicator being engageable with the work carried by the supporting means when the work supporting means is stationary, means controlled by the means actuating said work supporting means for actuating said movably mounted applicator, and means for traversing said applicator with respect to the work for obtaining bands thereon of different widths.

28. An ornamenting machine of the class described, comprising an intermittently movable work supporting means, means for actuating said work supporting means, a plurality of spacedly disposed ornamenting stations disposed adjacent said work means, including, a movably mounted applicator, said applicator being engageable with the work carried by the supporting means when the supporting means is stationary, means for supplying paint to the applicator, and means controlled by the means actuating said work supporting means for actuating said movably mounted applicator.

29. An ornamenting machine of the class described, comprising an intermittently movable work supporting means, means for actuating said work supporting means, an ornamenting station adjacent said work supporting means including a movably mounted applicator engageable with the work carried by the supporting means when the supporting means is stationary, a centering device for centering the work carried by the supporting means disposed adjacent said supporting means, and means controlled by the means actuating said work supporting means for actuating said movably mounted applicator and the centering device.

30. An ornamenting machine of the class described, comprising an intermittently movable work support, rotatably mounted spacedly disposed chucks carried by said support for supporting the ware, means for rotating said chucks, means for intermittently moving the work support, and a plurality of spacedly disposed ornamenting stations adjacent said work support, and engageable successively with the work carried by the chucks, each of said ornamenting stations including a movably mounted applicator, engageable with the work carried by the chucks when the work support is stationary, means for supplying paint to said applicators, and means controlled by the means actuating said work support for actuating said movably mounted applicators.

31. In an ornamenting device of the class described, an applicator station including an applicator, said applicator being mounted for traversing movement with respect to the ware, means normally urging said applicator in a predetermined position with respect to the ware, and means for moving said applicator predetermined distances in the opposite direction thereof for obtaining bands on the ware of different widths.

32. In an ornamenting machine of the character described including a pivotally mounted arm, an applicator on said arm, a reciprocating actuating arm having one end abutting said applicator arm for moving said applicator away from the ware, resilient means connected at one end to the applicator arm and at the other end to the actuating arm for urging said applicator arm and the applicator into engagement with the ware, and power means for reciprocating said actuating arm.

33. In combination with a banding machine including a rotatably mounted paint receptacle, means for rotating said receptacle and an applicator, a pump disposed within said receptacle and driven upon rotation of the receptacle, and conduit means for communicating the paint from said pump to the applicator.

34. In combination with a banding machine including a rotatably mounted paint receptacle, means for rotating said receptacle and an applicator, a pump disposed within said receptacle and driven upon rotation of the receptacle, conduit means for communicating the paint from said pump to the applicator, and means for conveying the unused paint from said applicator to the receptacle.

ROBERT H. JOHNSON.

DISCLAIMER 2,203,572.—*Robert H. Johnson*, Morgantown, W. Va. STRIPING OR BANDING MACHINE. Patent dated June 4, 1940. Disclaimer filed March 22, 1943, by the inventor.

Hereby enters this disclaimer to claims 19 to 32, inclusive, in said specification.

[*Official Gazette April 13, 1943.*]